June 13, 1961 D. W. CHRISTENSEN 2,988,404
ADJUSTABLE POWER DRIVE
Filed Oct. 20, 1958 2 Sheets-Sheet 1
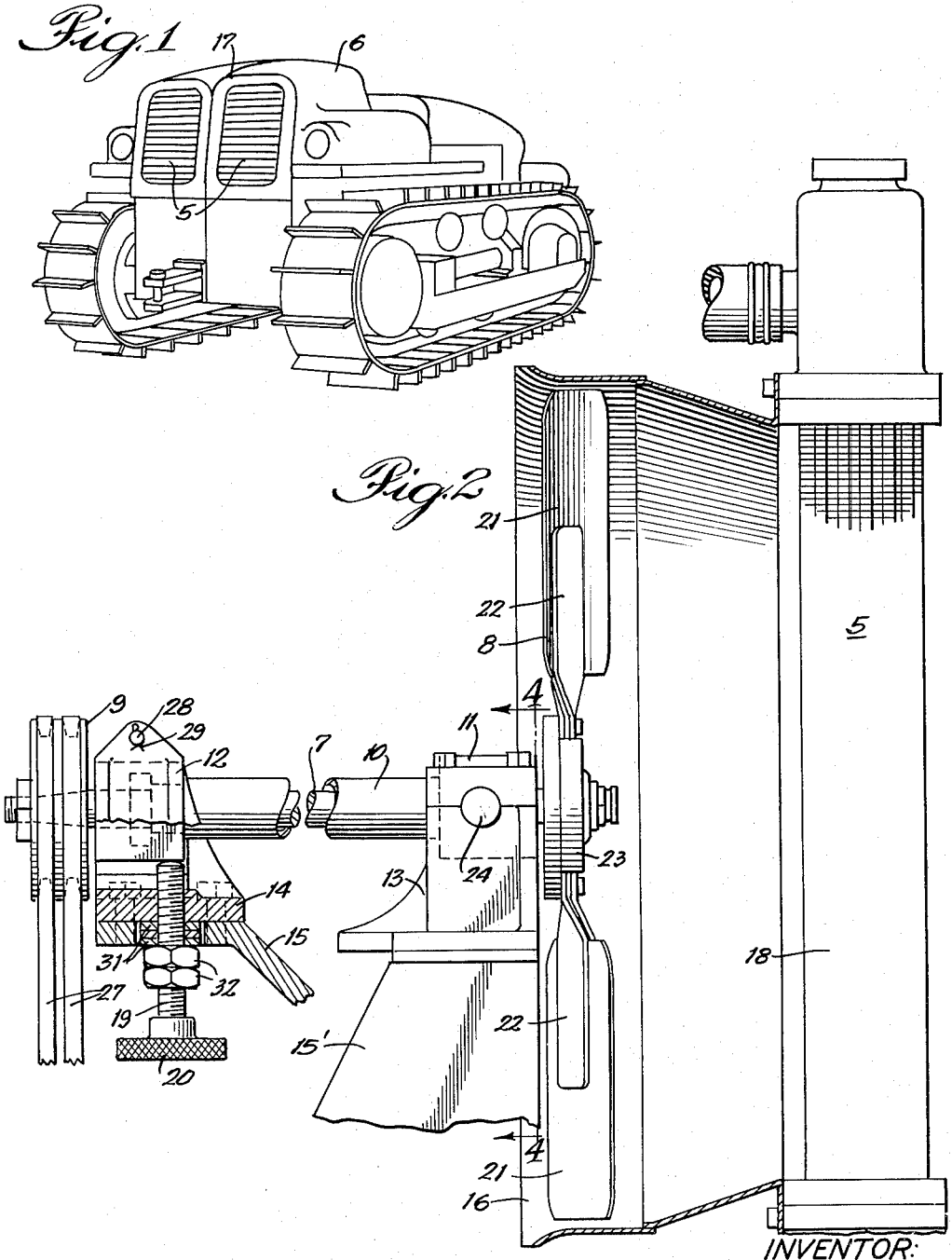
INVENTOR:
Donald W. Christensen,
BY
ATTORNEY Edwin Phelps June 13, 1961  D. W. CHRISTENSEN  2,988,404
ADJUSTABLE POWER DRIVE Filed Oct. 20, 1958  2 Sheets-Sheet 2

INVENTOR:
Donald W. Christensen,
BY
ATTORNEY

United States Patent Office 2,988,404
Patented June 13, 1961

2,988,404
ADJUSTABLE POWER DRIVE
Donald W. Christensen, Racine, Wis., assignor to Young Radiator Company, Racine, Wis., a corporation of Wisconsin
Filed Oct. 20, 1958, Ser. No. 768,327
3 Claims. (Cl. 308—33)

This invention relates to the support and drive for a radiator fan for the engine-jacket cooling system of heavy-duty, automotive equipment.

In many types of heavy-duty, automotive equipment, the massive engine units require fan-cooled radiators of comparatively large size for interposition in the engine-jacket cooling-system. In many instances these fan-cooled radiators have to be located on the chassis at some distance from the engine. The fan generally is belt-driven from a pulley on the drive shaft, or transmission shaft. Obviously, belt-tensioning mechanism has to be provided to insure effective operation of the fan.

In such massive automotive equipment, as tractors of the earth-moving type, the belt-tensioning mechanism has to be such that it will not create undue strain on the fan drive shaft. Heretofore, such strain has been limited by the use of universal joints.

The main objects of this invention are to provide an improved form of adjustable radiator-fan drive for engine-jacket cooling systems; to provide an improved fan drive of this kind wherein the fan and the belt-driven pulley are keyed to opposite ends of a single section of shaft and hingedly mounted at the fan end to permit vertical adjustment of the belt-driven pulley-end of the shaft to increase tension on the belt; and to provide an improved radiator-fan drive of this kind which is of simple construction and easy adjustment.

In the adaptation shown in the accompanying drawings;

FIG. 1 is a perspective view of a type of automotive equipment with which this improved adjustable fan drive is particularly adapted for use;

FIG. 2 is an enlarged, vertical elevation of an adjustable fan drive constructed in accordance with this invention;

Figure 3:
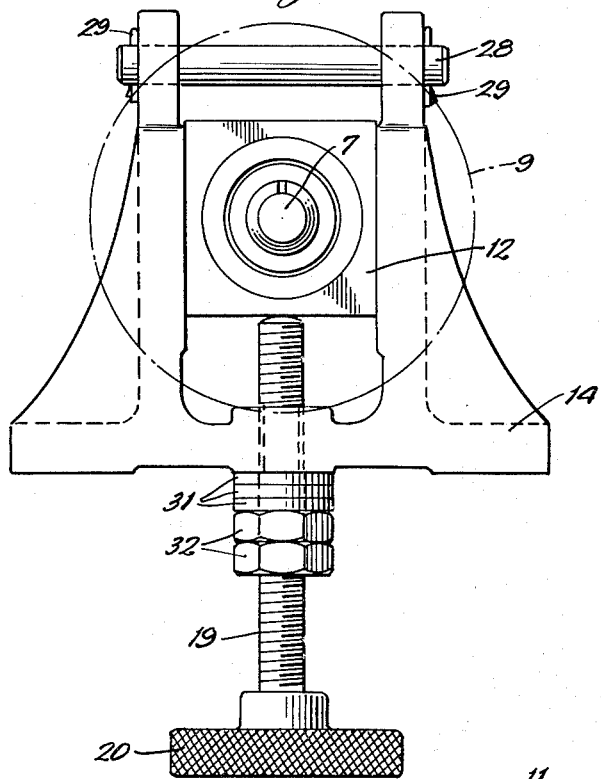
FIG. 3 is a further enlarged end elevation of the adjustable support for such a fan drive, as viewed from the left of FIG. 2.

The essential concept of this invention involves a tubular element housing a section of shaft, running in anti-friction bearings, on the opposite ends of which shaft are mounted the fan and the belt-driven pulley, the tubular element being supported on trunnions at the fan end and on a sliding bearing block at the pulley end for vertical adjustment by action of a hand wheel.

A crawler-tractor, as it is designated, such as shown in FIG. 1, mounts a pair of radiators 5 at the rear end of a suitable chassis and the engine, of which only the hood 6 here is shown, at the front end of the chassis. The operator's seat is located between the engine and the radiators 5, facing out over the engine hood 6. Fans for the radiators 5, of course, are located directly inward of the respective radiators. Since this positions the fans at a considerable distance from the source of drive obtained from the engine, it requires drive shafts of considerable length. Such shafts have to be driven by belts from a stub-shaft connected with the engine or its transmission. It becomes imperative, therefore, to so mount the fan-drive shafts as to permit tensioning the drive belts.

The herein shown improved adjustable fan drive, embodying the foregoing concept, for use with such equipment, comprises a shaft 7, to the opposite ends of which are keyed a fan 8 and a pulley 9, journaled in a section of tubing 10 secured at its respective ends to block members 11 and 12 mounted on brackets 13 and 14 fixed to supports 15 and 15' in appropriate horizontally-spaced relationship on the vehicle chassis so as to position the fan 8 in proper operative relationship with a shroud 16 of the radiator 5 and with the pulley 9 in position for belt connection to a suitable drive shaft (not shown), and vertical tensioning by action of a hand wheel 20.

The radiators 5 may be of any suitable type and are mounted on the vehicle chassis within a suitable housing 17. On each radiator 5 is arranged the shroud 16 through which ambient air is drawn and directed through the finned radiator core 18.

The shaft 7 is a section of conventional material with the opposite ends shaped to permit mounting of the fan 8 and the pulley 9 in the usual manner. Such a shaft is rotatably supported on anti-friction bearings (not shown) appropriately set in the respective block members 11 and 12.

The fan 8 here is shown of the conventional blow-through type, in which blades 21 are secured to arms 22 forming a part of a hub mounting 23 appropriately keyed to the end of the shaft 7.

The tubular element 10 also is a section of the usual material and machined at its ends to fit in and be bonded in an acceptable manner to the recessed block members 11 and 12.

The block members 11 and 12 are rectangular pieces of material of nearly the same dimensions. Each block is recessed inwardly from one face to receive the machined end of the tubular element 10 for bonding thereto. Inwardly from the opposite face, each block is recessed to mount one of the aforesaid anti-friction bearings with a suitable retaining ring.

The block 11 is formed with trunnions 24, extending outwardly from opposite faces of the block, for hingedly positioning the block 11 on the bracket 13 to permit vertical shifting of the block 12 on the bracket 14. These trunnions 24 are short sections of shafting seated in annular recesses in the block 11 and bonded thereto.

The block 12 is slidably positioned in the bracket 14 to normally rest on the end of an adjusting rod 19, as will be explained presently.

The brackets 13 and 14, although of similar U-shaped character, are different in their details since the bracket 13 hingedly supports the block 11 whereas the bracket 14 slidably supports the block 12. These brackets 13 and 14 are bolted in horizontally-spaced relationship to supports 15 and 15', respectively, supported on the chassis of the vehicle of the above-described type.

The belt-tensioning hand-wheel 20 is keyed to the lower end of the rod 19 which in turn is threaded into the base of the bracket 14. The rod 19 extends up through the bracket base in contact with the base of the block member 12. The block member 12 is held in contact with the upper end of the rod 19 by the tension of the belts 27. Suitable washers 31 and locknuts 32 are arranged on the rod 19 directly below the base of the bracket 14 so that once the rod 19 is set to secure the desired tension on the belts 27 there can be no change in the belt tension save by normal use and/or subsequent intentional adjustment of the rod 19.

A pin 28 extends across the top of the bracket 14 to prevent the block 12 from being accidentally separated from the bracket 14 in the event the belts 27 should break. The pin 28 is held in place by cotter pins 29.

Figure 4:
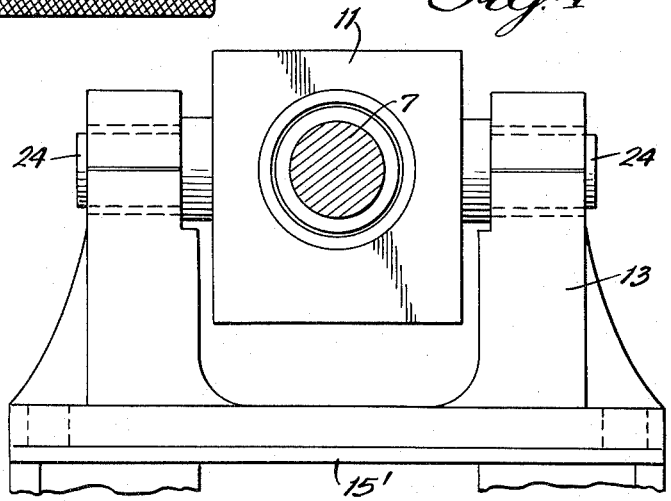
FIG. 4 is an opposite end elevation as viewed from the plane of the line 4—4 of FIG. 2.

Only those portions of the supports 15 and 15' are here shown whereon the brackets 13 and 14 directly rest (FIGS. 2, 3, and 4). It will be understood that what is here shown and referred to as supports 15 and 15' are an integrated part of the vehicle chassis whereon the radiators 5, the engine (not shown), and the operator's seat (not shown) are supported.

Such an improved adjustable fan drive is used in the following manner, in the normal operation of the vehicle whereon the fan drive is mounted.

The belts 27 being in place on the pulley 9, the loosened locknuts 32 permit rotating of the hand-wheel 20 to turn the rod 19 and shift the block 12 upwardly on the bracket 14 to secure the desired tension on the belts 27. The resetting of the locknuts 32 will secure this rod 19 in such adjusted position until conditions require some further adjustment of the belt to insure effective driving of the fan 5.

Variations and modifications in the details of structure and arrangement of the parts may be resorted to within the spirit and coverage of the appended claims.

I claim:

1. An adjustable power drive comprising, a support, a section of tubing, members secured to the opposite ends of the tubing to support it in non-rotatable relationship to the support and subject to adjusted axial disposition, a section of shaft journaled in the tubing with the ends of the shaft extending beyond the respective ends of the tubing, opposed horizontally-alined trunnions pivotally mounting one member on the support, means on the support mounting the other member for vertical shifting, and manually-operable means for shifting the other member to adjust the axial disposition of the tubing.

2. A power drive comprising, a support, a pair of U-shaped brackets fixed on the support in horizontally-spaced relationship, a section of tubing, members secured to the opposite ends of the tubing to support it in non-rotatable relationship to the support and subject to adjusted axial disposition, a section of shaft journaled in the tubing with the ends of the shaft extending beyond the respective ends of the tubing, opposed horizontally-alined trunnions pivotally mounting one member on one of the brackets, the other member being mounted on the other bracket for vertical shifting, and manually-operable means on the other braket for shifting the other member relative to the other bracket to adjust the axial disposition of the tubing.

3. A power drive comprising, a support, a pair of U-shaped brackets fixed on the support in horizontally-spaced relationship, a section of tubing, members secured to the opposite ends of the tubing to support it in non-rotatable relationship to the support, a section of shaft journaled in the tubing with the ends of the shaft extending beyond the respective ends of the tubing, trunnions pivotally mounting one member on one of the brackets, the other member being mounted on the other bracket for vertical shifting, manually-operable means on the other bracket for shifting the other member relative to the other bracket to adjust the axial disposition of the tubing, and a pin extending across the other bracket above the other member for limiting the upward vertical movement of the other member relative to the other bracket.

References Cited in the file of this patent

UNITED STATES PATENTS

| | | |
|---|---|---|
| 1,426,301 | Leoni | Aug. 15, 1922 |
| 1,461,236 | Webb | July 10, 1923 |
| 1,914,918 | Heermans | June 20, 1933 |
| 2,257,796 | Heineke | Oct. 7, 1941 |
| 2,450,080 | Burrell et al. | Sept. 28, 1948 |
| 2,862,453 | Nagle | Dec. 2, 1958 |